US010996669B2

(12) United States Patent
Herzog et al.

(10) Patent No.: US 10,996,669 B2
(45) Date of Patent: May 4, 2021

(54) WIRELESS CAPABILITY AND DISPLAY FOR COLLISION WARNING OF A VEHICLE-TRAILER UNIT

(71) Applicant: Continental Automotive Systems, Inc., Auburn Hills, MI (US)

(72) Inventors: Brandon Herzog, Waterford, MI (US); Ibro Muharemovic, Shelby Township, MI (US); Brian Saloka, Roseville, MI (US); Brian Keith Morrison, Harrison Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 234 days.

(21) Appl. No.: 16/015,971

(22) Filed: Jun. 22, 2018

(65) Prior Publication Data

US 2018/0299885 A1 Oct. 18, 2018

Related U.S. Application Data

(63) Continuation of application No. PCT/US2016/066163, filed on Dec. 12, 2016.
(Continued)

(51) Int. Cl.
*G05D 1/00* (2006.01)
*B62D 13/06* (2006.01)
(Continued)

(52) U.S. Cl.
CPC ............ *G05D 1/0033* (2013.01); *B60R 1/00* (2013.01); *B60R 1/003* (2013.01); *B62D 13/06* (2013.01);
(Continued)

(58) Field of Classification Search
CPC ...... G05D 1/0033; G05D 1/0016; B60R 1/00; B60R 1/003; B62D 13/06; H04N 7/183
See application file for complete search history.

(56) References Cited

U.S. PATENT DOCUMENTS

2008/0129539 A1 6/2008 Kumon
2009/0236825 A1* 9/2009 Okuda ..................... B60D 1/36
280/477
(Continued)

FOREIGN PATENT DOCUMENTS

CN 1795121 A 6/2006
CN 101270983 A 9/2008
(Continued)

OTHER PUBLICATIONS

International Search Report and Written Opinion dated Mar. 20, 2017 from corresponding International Patent Application No. PCT/EP2016/066163.
(Continued)

*Primary Examiner* — Hussein Elchanti

(57) ABSTRACT

A backing system for a vehicle and trailer includes a wireless control device in communication with an electronic control unit. The electronic control unit is configured with programming to record an image of a hitch for the vehicle and trailer assembly and determine a hitch angle using a plurality of reference points on the trailer which are viewed by the camera. The portions of the image which are relevant to a current position of the vehicle and trailer assembly are determined by the electronic control unit. Data regarding the relevant portions are sent to the control device via a secured wireless connection and displayed on a display.

16 Claims, 4 Drawing Sheets

Related U.S. Application Data

(60) Provisional application No. 62/270,807, filed on Dec. 22, 2015.

(51) Int. Cl.
  *B60R 1/00* (2006.01)
  *H04N 7/18* (2006.01)

(52) U.S. Cl.
  CPC ........... *G05D 1/0016* (2013.01); *H04N 7/183* (2013.01); *B60R 2300/806* (2013.01); *B60R 2300/808* (2013.01)

(56) References Cited

U.S. PATENT DOCUMENTS

| | | | | |
|---|---|---|---|---|
| 2011/0001614 | A1* | 1/2011 | Ghneim | G06F 3/0481 340/435 |
| 2014/0267688 | A1* | 9/2014 | Aich | B60W 50/0097 348/113 |
| 2015/0251697 | A1 | 9/2015 | Lavoie | |
| 2016/0288601 | A1* | 10/2016 | Gehrke | G06K 9/6201 |
| 2017/0151846 | A1* | 6/2017 | Wuergler | B60D 1/62 |
| 2019/0143895 | A1* | 5/2019 | Pliefke | H04N 7/183 348/118 |

FOREIGN PATENT DOCUMENTS

| | | |
|---|---|---|
| GB | 2398048 A | 8/2004 |
| JP | 2010263412 A | 11/2010 |
| JP | 2015131638 A | 7/2015 |

OTHER PUBLICATIONS

Chinese First Office Action dated Jul. 27, 2020 for the counterpart Chinese Patent Application No. 201680082366.5.

Japanese Office Action dated Feb. 1, 2021 for the counterpart Japanese Patent Application No. 2018-532595.

\* cited by examiner

WIRELESS CAPABILITY AND DISPLAY FOR COLLISION WARNING OF A VEHICLE-TRAILER UNIT

TECHNICAL FIELD

The present disclosure relates to automotive vehicles and more particularly to advance driver assistance systems for automotive vehicles.

BACKGROUND

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path, for example when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

In one exemplary embodiment, a method of controlling a backing system for a vehicle and trailer assembly includes initiating a backing system mode with an electronic control unit for a backing system when a start system input is received from a control device. The control device is wirelessly connected to the electronic control unit. The method also includes recording an image of a hitch for the vehicle and trailer assembly. The method further includes determining a hitch angle using a plurality of reference points on the trailer which are viewed by the camera. The method also includes determining which portions of the image are relevant to a current position of the vehicle and trailer assembly, and which portions of the image are non-relevant. The method further includes sending data regarding the relevant portions to the control device via a secured wireless connection. The relevant portion of the image is displayed on a display for the control device.

A backing system for a vehicle and trailer assembly, according to one exemplary embodiment, includes a wireless control device and an electronic control unit. The electronic control unit is wirelessly connected to the control device to receive at least one input from the control device. The electronic control unit includes instructions for initiating a backing system mode with an electronic control unit for a backing system when a start system input is received from a control device. The electronic control unit also includes instructions for recording an image of a hitch for the vehicle and trailer assembly and determining a hitch angle using a plurality of reference points on the trailer which are viewed by the camera. The electronic control unit further includes instructions for determining which portions of the image are relevant to a current position of the vehicle and trailer assembly, and which portions of the image are non-relevant. The electronic control unit also includes instructions for sending data regarding the relevant portions to the control device via a secured wireless connection and displaying the relevant portion of the image on a display for the control device.

BRIEF DESCRIPTION OF THE DRAWINGS

The present disclosure will become more fully understood from the detailed description and the accompanying drawings, wherein.

DETAILED DESCRIPTION

Figure 1:
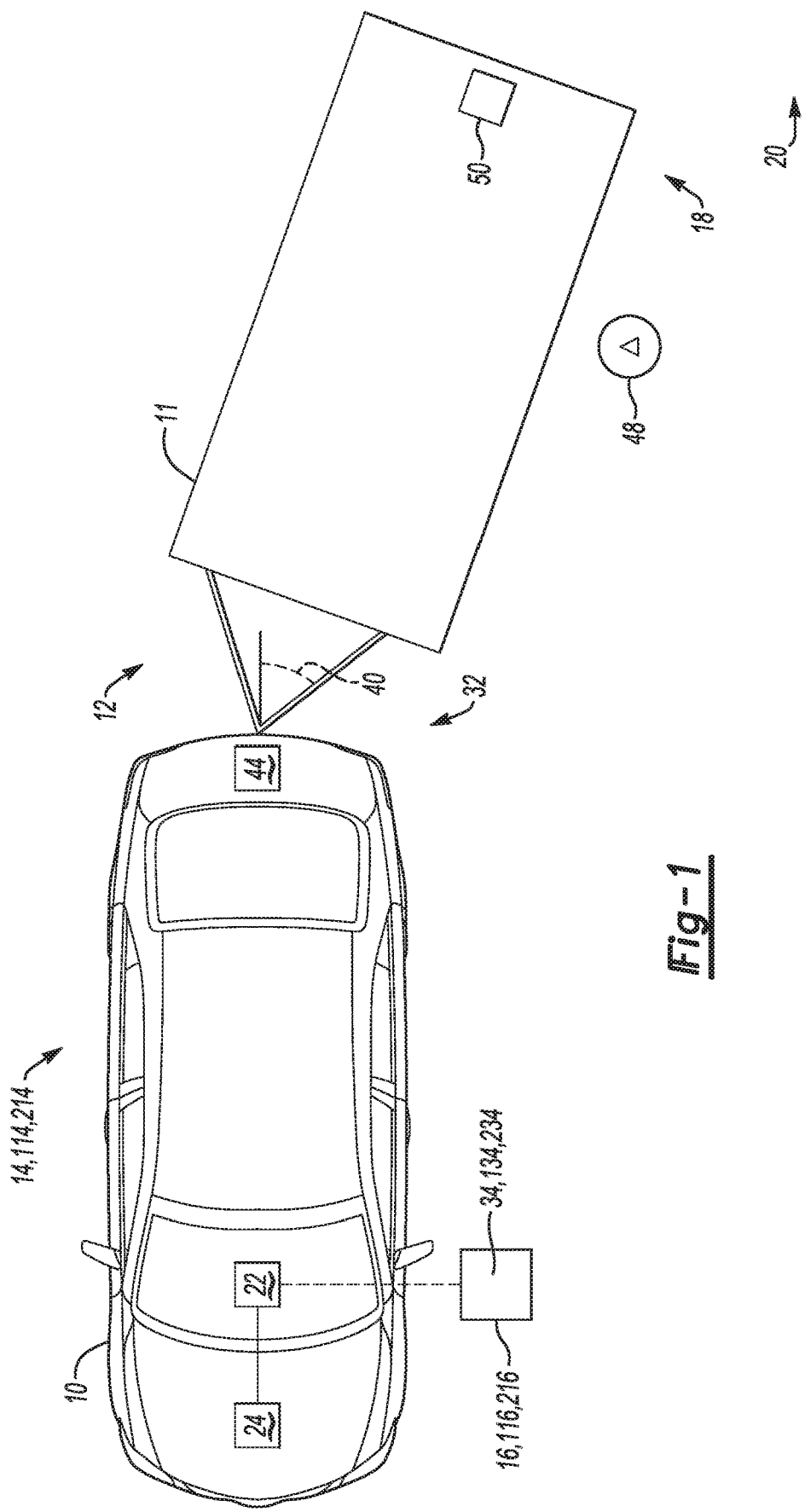
FIG. 1 is a schematic diagram of a vehicle and trailer assembly having a trailer backing system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11. The trailer 11 is controllably secured to the vehicle 10 to form a vehicle and trailer assembly 12. The vehicle and trailer assembly 12 utilizes a trailer backing system 14 of the present invention. Throughout the application the relative directions of forward and rear are used in the traditional manner. That is, in reference to the direction which an operator for the vehicle 10 would typically be facing when driving the vehicle 10. Therefore, in operation of the trailer backing program 14 the vehicle 10 would be in a reverse gear and the vehicle and trailer assembly 12 are moving backward. During use of the backing system 14, the operator of the system 14 may also be facing or walking "backward" in the same direction the vehicle-trailer unit 12 is moving.

Figure 2:
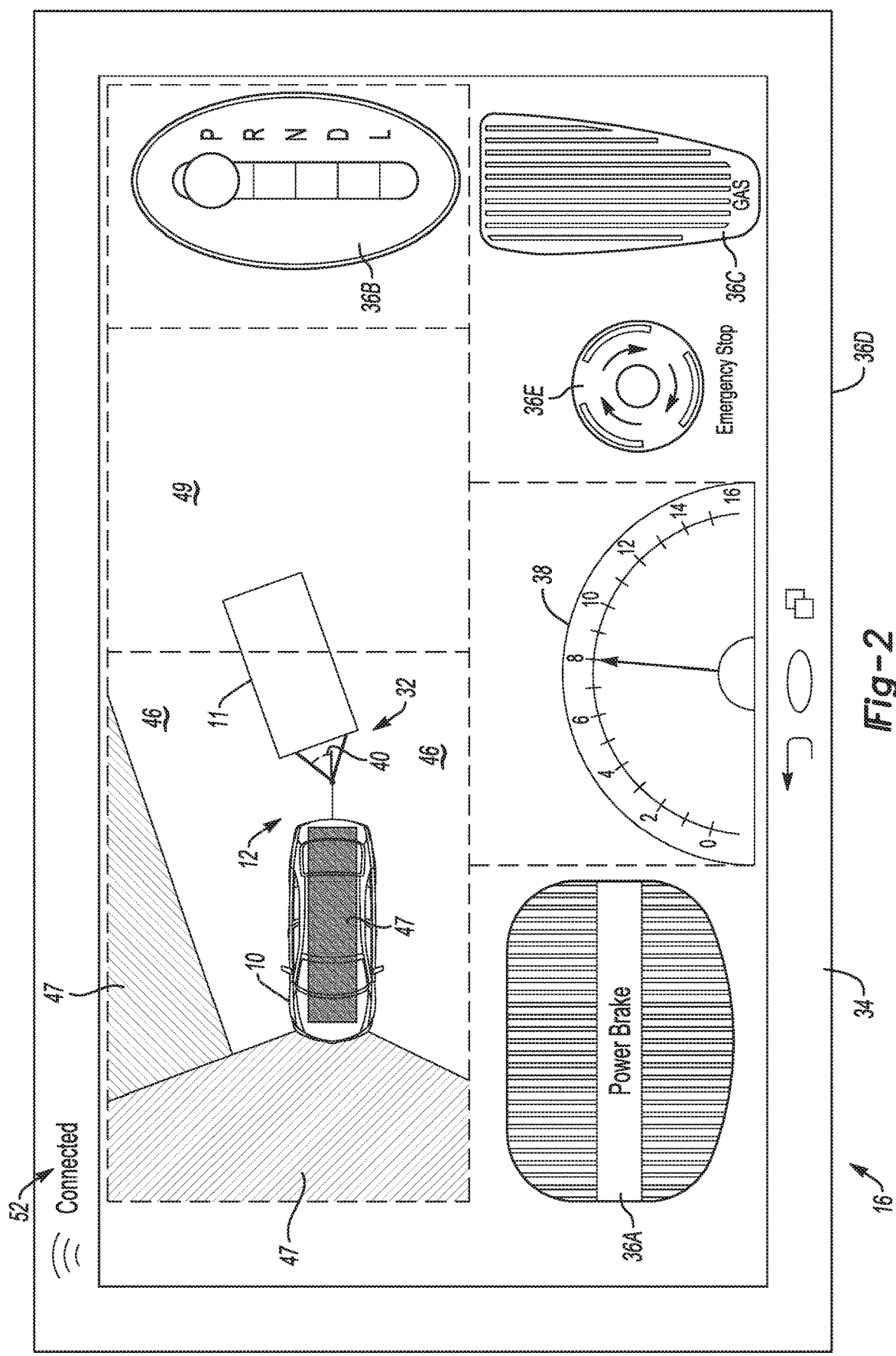
FIG. 2 is a first embodiment for the trailer backing system of FIG. 1, where the wireless controller is a mobile device and the graphical look shown on the screen is illustrated.
Figure 3:
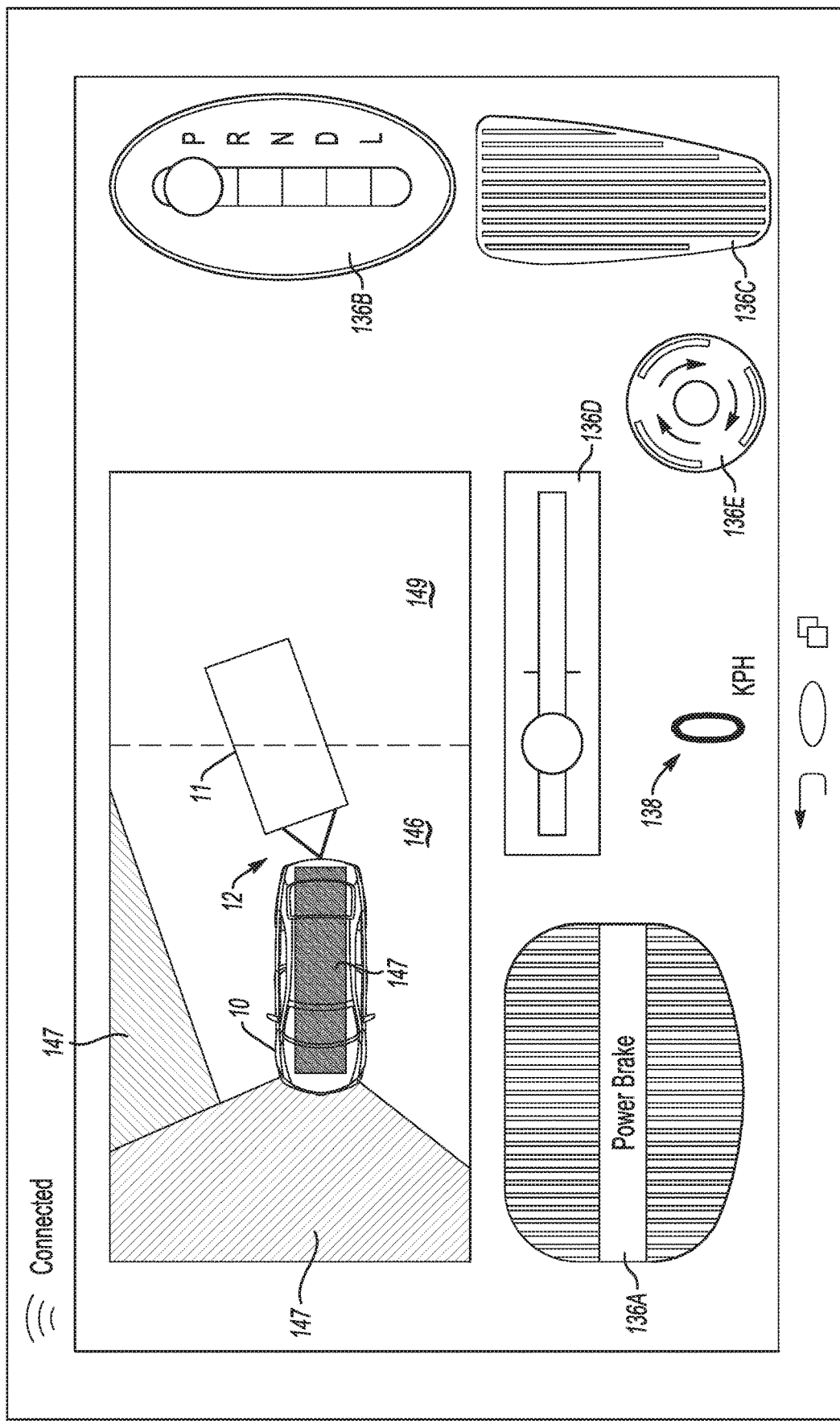
FIG. 3 shows another embodiment of a graphical look of the screen for the mobile device for the trailer backing system of FIGS. 1-2.

Referring to FIGS. 1-3, a first embodiment for utilizing the trailer backing program 14 is described. A wireless control device 16 is wirelessly connected to allow a user to input instructions to an electronic control unit ("ECU") 22 for the trailer backing program 14. The ECU 22 may be connected to various vehicle systems 24 such as a powertrain system, a steering system, a brake system, etc. to control and direct movement of the vehicle and trailer assembly 12. The ECU 22 sends instructions to the vehicle systems 24 to move the vehicle and trailer assembly 12 along a desired backing path 18 to a final location 20 based upon user inputs.

The wireless control device 16 acts as a human machine interface ("HMI") between the operator and the backing system 14. The control device 16 may be a tablet or other mobile device that can be operated from outside the vehicle 10. Therefore, the trailer backing system 14 gives a user control of the vehicle 10 while outside the car. For example, the user can shift gears of the vehicle 10, e.g. from park to reverse and back again. The wireless control device 16 allows the user to maneuver the vehicle trailer 12. The control device 16 may have various input options to control the vehicle trailer 12 including buttons and/or virtual display of HMI inputs for: the gear selector (to enable wireless shifting between gears), a gas pedal, a brake pedal, a digital speedometer, a surround view and an emergency stop button. The emergency stop button may be implemented as a safety measure and will bring the vehicle 10 to an immediate stop and shift the vehicle 10 into Park when wireless control is active.

The ECU 22 receives a variety of inputs 26 (shown in FIG. 4) from the control device 16 to control the vehicle and trailer assembly 12 with the backing system 22. The ECU 22 interprets the various inputs 26, and determines the desired vehicle action 28 (shown in FIG. 4) that the input 26 is requesting. Based upon a current status 32 of the vehicle and trailer assembly 12, and the desired vehicle action 28 the ECU 22 determines a required vehicle response 30 (shown in FIG. 4) needed to achieve the desired vehicle action 28, and sends the appropriate signal(s) to instruct the various vehicle systems 24 to perform the calculated vehicle response 30, as explained in the various examples below. The backing system 22 can incorporate the variety of input requests to provide complete user control of the vehicle and trailer assembly 12 from outside the vehicle 10.

One example input 26A allows the user to apply the brakes of the vehicle 10. A display screen 34 for the control device 16 may include a brake pedal image 36. By the user tapping/selecting the image 36 a first input 26A is sent to the ECU 22. The ECU 22 interprets from the first input 26A that the desired vehicle action 28 is a brake request. Interpreting the first input 26A signal to determine the desired vehicle action 28, may include interpreting from the signal information requested braking rate, requested braking time, etc. For example, the first input 26A signal may include information that the user tapped and released the image 36A. The ECU 22 can interpret this information to be a request for a short application and release of the brakes. Alternatively, the first input 26A signal may include information that the user tapped and held the image 36A. The ECU 22 can interpret this information to be a request to apply and hold the brakes. Therefore, ECU 22 interprets the input signal 26A to determine the desired vehicle action 28, and then calculates the required vehicle response 30, e.g. partial brake pressure application, and release when desired pressure is achieved. The ECU 22 then sends the appropriate signal(s) to instruct the vehicle brake system 24 to perform the calculated response 30.

Another example input 26B allows the user to shift gears of the vehicle 10, e.g. from park to reverse. The display screen 34 may include a gear selector image 36B. The image shown is a typical PRND position selector which shows which gear the vehicle is in, at the start the vehicle 10 is in the park position. The user can select and move the gear selector in the image 36B to a desired gear position, e.g. reverse). The user may also be required to request vehicle brake apply (as described above) while moving the gear selector, as is typical when shifting gears inside the vehicle. A second input 26B is sent to the ECU 22. The ECU 22 interprets from the second input 26B that the desired vehicle action 28 is a gear shift request. Interpreting the second input 26B signal to determine the desired vehicle action 28, includes interpreting from the signal information which gear has been selected. The, ECU 22 interprets the input signal 26B to determine the desired vehicle action 28, and then calculates the required vehicle response 30, e.g. gear shift. The ECU 22 then sends the appropriate signal(s) to instruct the vehicle drive system 24 to perform the calculated response 30, e.g. shift into reverse. When the vehicle 10 is shifted into gear from the park position the engine continues to idle. Engine idle will probably provide enough power for the vehicle and trailer assembly 12 to begin moving at a walking pace allowing the user to walk along with the vehicle and trailer assembly 12 during the backing process if so desired. In further detail, the ECU 22 interprets the control device 16 inputs as user request relating to gear shifting, where the user request is entered by dragging on PRND 36B which triggers a shifting event. The ECU 22 responds to the input with ACK or NACK (acknowledged or not acknowledged) and vehicle is shifted safely which, allows forward and reverse control for corrections.

Once the backing system 14 is operating and the vehicle 10 is in reverse the ECU 22 can receive input from the user to control the speed of the vehicle and trailer assembly through a virtual gas pedal 36C, and the previously described virtual brake pedal 36A. For safety, since the user is not in the vehicle 10, the virtual gas pedal 36C must be periodically tapped/selected. The ECU 22 receives the input signal 22C from the virtual gas pedal 36C and interprets the signal to allowing continuing movement of the vehicle and trailer assembly 12. The periodic tapping/selecting simulates a continuous driver intent which ensures that the user is still actively in control. Should the user stop tapping/selecting the virtual gas pedal 36C the vehicle 10 will decelerate until stopped. Deceleration to stop may also occur when holding the virtual gas pedal in pressed state.

However, acceleration of the vehicle and trailer assembly 12 may be desired under some circumstances, such as when moving the vehicle and trailer assembly 12 uphill. In this instance, the user input may need to change to reflect the desired vehicle action 28. The desire to accelerate may be increasing the rate of periodically tapping/selecting the virtual gas pedal 36C, for each periodic tap holding the pedal for a slightly longer time period, or holding the virtual gas pedal down continuously. In all situations where acceleration is requested the maximum vehicle speed allowed would still be limited for safety.

A virtual speedometer 38 can also be displayed showing the speed of the vehicle 10. The virtual speedometer 38 can have color codes illustrating different speed recommendations, provided by the ECU 22, for the vehicle and trailer assembly 12 when using the backing system 14.

Once the backing system 14 is operating and the vehicle is in reverse the user can also control the trailer 11 travel direction by providing the appropriate input 26C from the control device 22 to the ECU 22. In one embodiment, tilting the device 16 can be used to provide a steering input 26D. Accelerometer readings available on the smart device 16 are measured and sent to the ECU 16 as part of a steering input signal 26D. Interpreting the steering input 26D to determine the desired vehicle action 28, may include interpreting from the signal information for direction of accelerometer reading, corresponding to requested direction of travel, and amount of acceleration, corresponding to increasing/decreasing hitch angle. The desired vehicle action 28 is movement of the trailer 11 in a certain direction and a certain amount. The ECU 22 interprets this desired vehicle action 28, as the hitch angle required to move the trailer 11 in the desired direction. The ECU calculates the hitch angle requested 28 based on the input 26D. The ECU 22 then calculates the required vehicle response 30, which is the steering angle needed to move the trailer 11 to the desired hitch angle. The required steering angle 30 is based on the current steering angle, the current hitch angle (see further details below on measuring current hitch angle) and the requested hitch angle 28. Once the ECU 22 has calculated the steering angle needed the ECU 22 then sends the appropriate signal(s) to instruct the vehicle steering system 24 to adjust to the calculated response 30.

In another embodiment, the display screen 34 may include a selector and slider bar image 36D and travel direction of the trailer 11 can be controlled by moving the selector along the slider bar 36D. A steering input 26D is sent to the ECU 22. The ECU 22 interprets from the steering input 26D that the desired vehicle action 28 is a steering request. Interpreting the steering input 26D to determine the desired vehicle action 28, may include interpreting from the signal information the direction of selector movement, corresponding to requested direction of travel, and amount of selector movement on the slider bar, corresponding to increasing/decreasing hitch angle. The desired vehicle action 28 is movement of the trailer 11 in a certain direction and a certain amount. The ECU 22 interprets this desired vehicle action 28, as the hitch angle required to move the trailer 11 in the desired direction. The ECU calculates the hitch angle requested 28 based on the input 26D. The ECU 22 then calculates the required vehicle response 30, which is the steering angle needed to move the trailer 11 to the desired hitch angle. The required steering angle 30 is based on the current steering angle, the current hitch angle (see further details below on measuring current hitch angle) and the requested hitch angle 28. Once the ECU 22 has calculated the steering angle needed the ECU 22 then sends the appropriate signal(s) to instruct the vehicle steering system 24 to adjust to the calculated response 30.

A display screen 34 for the control device 16 may include a brake pedal image 36. By the user tapping/selecting the image 36 a first input 26A is sent to the ECU 22. The ECU 22 interprets from the first input 26A that the desired vehicle action 28 is a brake request. Interpreting the first input 26A signal to determine the desired vehicle action 28, may include interpreting from the signal information requested braking rate, requested braking time, etc. For example, the first input 26A signal may include information that the user tapped and released the image 36A. The ECU 22 can interpret this information to be a request for a short application and release of the brakes. Alternatively, the first input 26A signal may include information that the user tapped and held the image 36A. The ECU 22 can interpret this information to be a request to apply and hold the brakes. Therefore, ECU 22 interprets the input signal 26A to determine the desired vehicle action 28, and then calculates the required vehicle response 30, e.g. partial brake pressure application, and release when desired pressure is achieved. The ECU 22 then sends the appropriate signal(s) to instruct the vehicle brake system 24 to perform the calculated response 30.

In further detail, the backing system 14 may have a variety of safety features, including ECU 22 control of emergency Stop. An emergency stop image 36E may be separate from a brake image 36A. An emergency stop input 26E may be triggered by pressing the emergency stop image 36E. The ECU 22 may interpret the desired vehicle action 28 and the required vehicle response 30 to both (emergency) stopping of the vehicle 10 and placing the transmission into a park mode, when safe. A backing system on/off switch 42 (not shown) may require specific release (press image 36F to light up) in order for the ECU 22 to shift control of the vehicle 10 to the user through the backing system 14. For safety the backing system 14 may include a feature to detect user attentiveness and confirm that the user is actively controlling the vehicle and trailer 12, e.g. the gas pedal 36C on the screen 34 must be periodically tapped by the user to indicate actively controlling the system 14. Gradual stop occurs if the user holds or does not tap the gas pedal 36C for too long. By pressing the brake pedal on the screen gradual deceleration of vehicle to lower the speed of the assembly 12 occurs. The speed the system 12 may be limited to a safe walking speed (e.g. 2.5 kph), also limited by the minimum speed reported by the vehicle. Other safety measures may include timeout detection, redundant information confirmations such as, respond with interpreted data to check for inconsistencies, and checksum calculations and checks.

The backing system 14 may use camera(s) 44 on the vehicle 10 to provide a surround view of the vehicle 10. Additionally, the ECU 22 may use the camera 44 information as one method used to measure the current hitch angle 40. The measured hitch angle 40 is used by the ECU 22 to determine the desired steering angle 30 based on the requested hitch angle 28 calculated from the user input 26D. The current hitch angle 40 may also be displayed on the device 16 as well for user information.

In all embodiments, the camera 44 may be used to determine hitch angle 40, preferably a camera which is already installed in the vehicle 10, such as a back-up camera or a surround view camera. The camera 44 may capture an image and image analysis may be used to calculate the hitch angle 40.

One embodiment of using the camera 44 to determine hitch angle uses a distinct marking that can be established on the trailer 11 and captured by the camera 44 for analysis. For example, the marking may be a 3 or more of dots/marks spaced apart from one another both horizontally and vertically. The marking is positioned on the front of the trailer 11 proximate to the hitch 15 in view of the camera. The camera 44 may capture an image of the marking and the ECU 22 may analyze the image to determine the relative position of the dots to one another. The ECU 22 compares the relative measured distances of the marks and to stored data of the relative distances. The stored data would include at what hitch angle 40 those relative distances would occur. Thus, the hitch angle 40 can be calculated using a camera for the sensor 26 and a predetermined distinct marking. The markings may be specific to the trailer backing system 14, e.g. a know decal to be applied to the trailer 11, since the relative distances of the markings may be prerecorded by the ECU 22. The distance to the marking from the camera 16 may also need to be input into the system 14.

In another embodiment, the trailer backing system 14 can use reference points on the trailer 11 as markings, such as the corners of the trailer, hitch attachment point, body decals that are provided by the manufacturer, etc. The reference points may be vertically and horizontally spaced from one another. Preferably at least three reference points are used. The ECU 22 may employ a learning mode to learn the relative distances of the reference points at known hitch angles 40 the first time the system 14 is used. Thus, the trailer backing system 14 could learn the relative distances between the markings when the trailer 11 is hitched to the vehicle 10 and at a known angle, e.g. zero degrees hitch angle.

In addition to calculating hitch angle the image from the camera 44 can be shown on the display 46. If multiple cameras are used the surround view of the vehicle 10 may also be integrated to display 46 on the mobile device 16. Additionally, objects 48 on the surround view image 46 can be highlighted to warn drivers of possible collisions. In particular, if the user is near the front of the vehicle 10 the vehicle 10 may rotate around at a faster than expected rate.

The surround view function presents the driver with a dynamic set of synthetic viewpoints that provide an unobstructed view of the ground both in the immediate vicinity of the vehicle 10 as well as in the medium distance. The viewpoints are completely configurable and useful for parking and reversing maneuvers. In one embodiment an extended surround view capability may be provided by using another camera 50 connected at the rear of the trailer 11 to increase visibility.

Whether the display 46 is a single camera 44 or a stitched image providing a surround view, the data transfer from the ECU 22 to the wireless device 16 to provide the display 46 may be quite large. One option for transfer of the information is for the backing system 14 to use a Wi-Fi Network of the vehicle 10 or if the backing location has one nearby (e.g. at a campground). The Wi-Fi Network provides a way to communicate the video feed to the wireless device 16 for the display 46. Another option for secured wireless transfer of the data is low band width communications, such as RF communications, with the wireless device 16 may be desired to take advantage of external control technologies to secure the data during transfer.

In order to accommodate for the low bandwidth, and still provide the display 46, only data relating to the most relevant sections may be transferred to the wireless device 16. The less relevant sections 47 of the display 46 may be not shown, or may be schematically represented on the display 46. The not-relevant portion 47 can be "blacked out" to avoid distracting the operator, or can be replaced with a graphical representation of the area. For example, when the backing system 14 is in Reverse gear the area in front of the vehicle 10 is not relevant to the operator. This non-relevant area 47 could be not shown on the display 46 and the data related to that section of the image 46 does not need to be transferred to the wireless device 16. Thus, the amount of data to be transferred is reduced. Additionally, areas that are farther away from the vehicle-trailer unit 12 are less or not as relevant areas 47 as well. These portions 47 of the image 46 can also be not shown. The ECU 22 for the backing system 14 can determine which areas 47, are less relevant based on pre-set conditions included within the system algorithm.

Several other areas may be not-relevant portions 47 as well. For example, the center areas of the vehicle 10 and/or the trailer 11 are not as significant to the display 46 either, only the data relating to the edges of the vehicle 10 and/or trailer 11 can be transferred to the wireless device 16. The not-relevant portions 47 of the vehicle 10 and/or the trailer 11 can be "blacked out" to avoid distracting the operator, or can be replaced with a graphical representation of the vehicle 10.

Additionally, objects 48 that are possible obstacles or key areas on the image 46 can be highlighted to warn drivers of possible collisions or to increase the alert level for that area of the display 46. Area 49 also indicates an image that is only available, for display 46 when the trailer 11 has a camera 50 as well. Without area 49 that operator can still easily view the hitch angle 40 and objects that are proximate to the vehicle-trailer unit 12 and not obstructed by trailer 11 for the camera 44 view.

FIG. 3 shows another embodiment of a graphical look of the HMI for the screen 134 for a mobile device 116 and a backing system 114. For example, once a status bar 52 shows that the device 116 is connected to the vehicle 10 via the ECU 22 then the emergency stop 136E may be depressed. Once this has been done and the red emergency stop 136E lights up then the mobile device 116 is in control of the vehicle 10. The user must press and hold the brake 136A in order to shift gears. To steer the user physically tilts the device 116, although other options of control are possible utilizing the screen 134 of the mobile device 16 or even Bluetooth/wireless connection.

Figure 4:
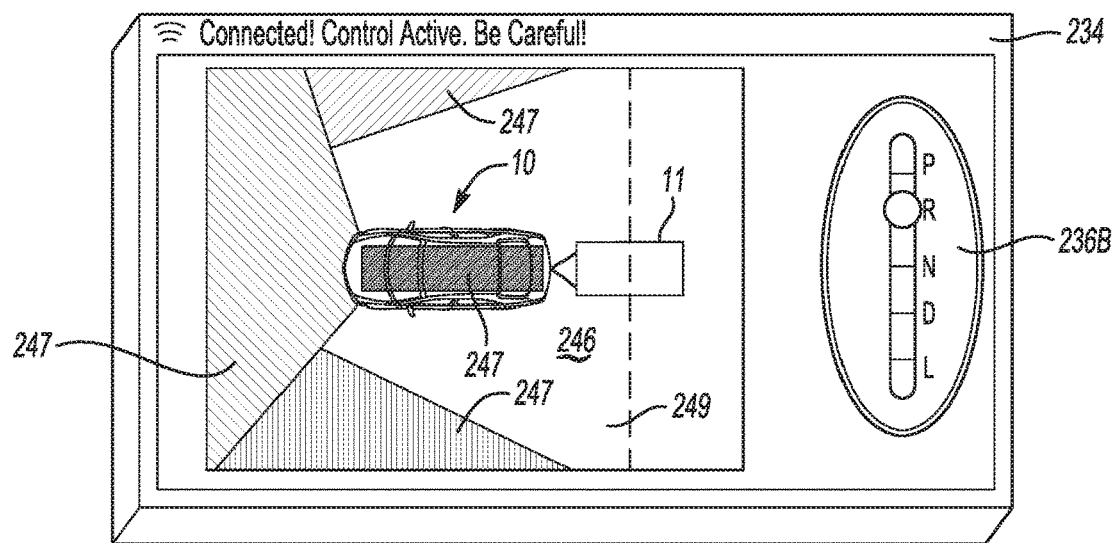
FIG. 4 is a second embodiment for the trailer backing system of FIG. 1, where the wireless controller is a joystick with a display screen and the graphical look shown on the screen is illustrated.
Figure 4:
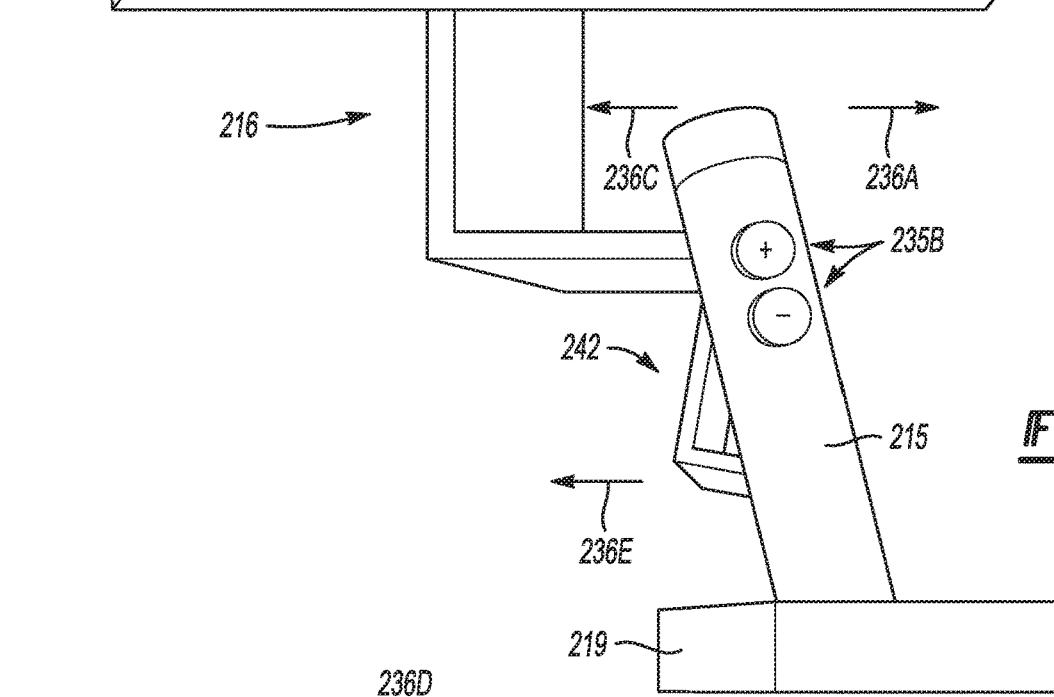
Figure 4A:
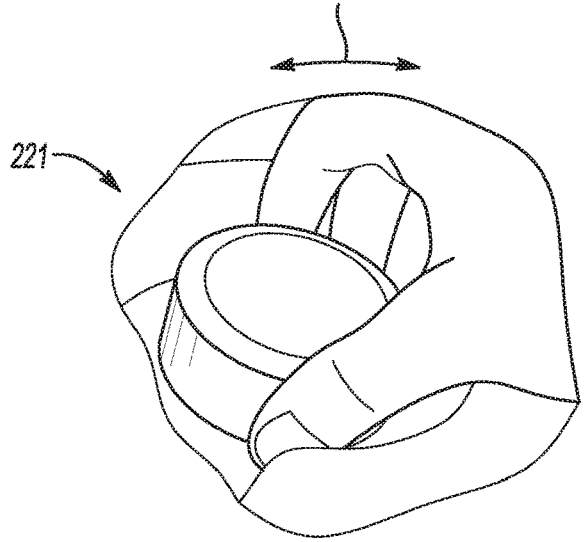
FIG. 4A is an enlarged view of a controller knob for the joystick of FIG. 4.

FIGS. 1 and 4-4A illustrate a second embodiment for utilizing the trailer backing program 214. A wireless control device 216 is wirelessly connected to allow a user to input instructions to an electronic control unit ("ECU") 22 for the trailer backing program 214. The ECU 22 may be connected to various vehicle systems 24 such as a powertrain system, a steering system, a brake system, etc. to control and direct movement of the vehicle and trailer assembly 12. The ECU 22 sends instructions to the vehicle systems 24 to move the vehicle and trailer assembly 12 along a desired backing path 18 to a final location 20 based upon user inputs.

The wireless control device 216 may be a joystick assembly having a joystick 215 that moves relative to a joystick base 219 and a control knob 221 that rotates relative to the joystick 215. The joystick assembly 216 may also include a display screen 234 and a safety control button 242, as described in further detail below with a display screen that can be operated from outside the vehicle 10 and wirelessly connected to the ECU 22 with a secure connection.

Therefore, the trailer backing system 214 gives a user control of the vehicle 10 while outside the car. For example, the user can shift gears of the vehicle 10, e.g. from park to reverse and back again. The wireless control device 216 provides a HMI that allows the user to maneuver the vehicle trailer 12. The control device 216 may have various input options to control the vehicle trailer 12 including control and/or virtual display HMI inputs such as: the gear selector (to enable wireless shifting between gears), a gas pedal control, a brake pedal control, a digital and/or analog speedometer, a video stream from the 360 Surround View system and/or a graphical representation of the vehicle highlighting potential warning zones. An emergency stop feature may be implemented as a safety measure and will bring the vehicle 10 to an immediate stop and shift the vehicle 10 into Park when wireless control 216 is active. For example, the emergency stop feature may be activated releasing a safety control switch 242. Other methods and/or additional buttons may be used to provide an emergency stop feature. One skilled in the art would be able to determine the best arrangement for implementing an emergency stop feature for a particular joystick 216 design.

The ECU 22 receives a variety of inputs 226 from the control device 216 to control the vehicle and trailer assembly 12 with the backing system 214. The ECU 22 interprets the various inputs 226, and determines the desired vehicle action 28 that the input 226 is requesting. Based upon a current status 232 of the vehicle and trailer assembly 12, and the desired vehicle action 28 the ECU 22 determines a required vehicle response 30 needed to achieve the desired vehicle action 28, and sends the appropriate signal(s) to instruct the various vehicle systems 24 to perform the calculated vehicle response 30, as explained in the various examples below. The backing system 214 can incorporate the variety of input requests to provide complete user control of the vehicle and trailer assembly 12 from outside the vehicle 10 over the secured wireless connection.

One example input 226A allows the user to apply the brakes of the vehicle 10. For example, while holding the joystick 215 the user may be required to press the safety control button 142. While the safety control button 242 is being depressed movement of the joystick 215, e.g. relative to a joystick base 219 toward the user 236A may be interpreted as a desired input 226A of braking the vehicle 10. That is, when the user pulls the joystick 215 towards themselves a first input 226A is sent to the ECU 22. The ECU 22 interprets from the first input 226A that the desired vehicle action 28 is a brake request. Interpreting the first input 226A signal to determine the desired vehicle action 28, may include interpreting from the signal information requested braking rate, requested braking time, etc. For example, the first input 226A signal may include information that the user pulled and released the joystick 215. The ECU 22 can interpret this information to be a request for a short application and release of the brakes. Alternatively, the first input 226A signal may include information that the user pulled and held the joystick 215. The ECU 22 can interpret this information to be a request to apply and hold the brakes. Therefore, ECU 22 interprets the input signal 226A to determine the desired vehicle action 28, and then calculates the required vehicle response 30, e.g. partial brake pressure application, and release when desired pressure is achieved. The ECU 22 then sends the appropriate signal(s) to instruct the vehicle brake system 24 to perform the calculated response 30.

Another example input 226B allows the user to shift gears of the vehicle 10, e.g. from park to reverse. The display screen 234 may include a gear selector image 236B. The image shown is a typical PRND position selector which shows which gear the vehicle is in, at the start the vehicle 10 is in the park position. The user can select and move the gear selector in the image 236B to a desired gear position, e.g. reverse) by using the gear selector buttons 235B to move position selector up/down on the image 236B. The user may also be required to request vehicle brake apply (as described above) while moving the gear selector, as is typical when shifting gears inside the vehicle 10. A second input 226B is sent to the ECU 22. The ECU 22 interprets from the second input 226B that the desired vehicle action 28 is a gear shift request. Interpreting the second input 226B signal to determine the desired vehicle action 28, includes interpreting from the signal information which gear has been selected. The, ECU 22 interprets the input signal 226B to determine the desired vehicle action 28, and then calculates the required vehicle response 30, e.g. gear shift. The ECU 22 then sends the appropriate signal(s) to instruct the vehicle drive system 24 to perform the calculated response 30, e.g. shift into reverse. When the vehicle 10 is shifted into reverse gear from the park position the engine continues to idle. Engine idle will probably provide enough power for the vehicle and trailer assembly 12 to begin moving at a walking pace allowing the user to walk along with the vehicle and trailer assembly 12 during the backing process if so desired. The ECU 22 responds to the input 226B with ACK or NACK (acknowledged or not acknowledged) and vehicle 10 is shifted safely which, allows forward and reverse control for corrections.

Once the backing system 114 is operating and the vehicle 10 is in reverse the ECU 22 can receive input from the user to control the speed of the vehicle and trailer assembly 12 through a forward motion 236C of the joystick 115, and the previously described brake movement 236A of the joystick 115. For safety, since the user is not in the vehicle 10, the safety control button 142 must remain depressed while the vehicle and trailer assembly 12 is in motion. If the safety control button 242 is released, 236E, the ECU 22 will stop the vehicle and trailer assembly 12 and shift the vehicle 10 into park. The ECU 22 receives the input signal 226E from the virtual safety control button 242 and interprets the signal to allowing continuing movement of the vehicle and trailer assembly 12.

However, acceleration of the vehicle and trailer assembly 12 may be desired under some circumstances, such as when moving the vehicle and trailer assembly 12 uphill. In this instance, the user input may need to change to reflect the desired vehicle action 28. The desire to accelerate may be moving the joysick 215 forward 236C and holding it in the forward position. In all situations where acceleration is requested the maximum vehicle speed allowed would still be limited for safety.

Once the backing system 14 is operating and the vehicle is in reverse the user can also control the trailer 11 travel direction by providing the appropriate input 226D from the control device 22 to the ECU 22. In one embodiment, rotating a control knob 221 can be used to provide a steering input 226D. Interpreting the steering input 226D to determine the desired vehicle action 28, may include interpreting from the signal information for direction the knob 121 is moved 236D as, corresponding to requested direction of travel for the trailer 11, and amount the knob 221 is turned, i.e. rotation angle, as corresponding to increasing/decreasing hitch angle. The desired vehicle action 28 is movement of the trailer 11 in a certain direction and a certain amount. The ECU 22 interprets this desired vehicle action 28, as the hitch angle required to move the trailer 11 in the desired direction. The ECU 22 calculates the hitch angle requested 28 based on the input 226D. The ECU 22 then calculates the required vehicle response 30, which is the steering angle needed to move the trailer 11 to the desired hitch angle. The required steering angle 30 is based on the current steering angle, the current hitch angle (see further details below on measuring current hitch angle) and the requested hitch angle 28. Once the ECU 22 has calculated the steering angle needed the ECU 22 then sends the appropriate signal(s) to instruct the vehicle steering system 24 to adjust to the calculated response 30.

In further detail, the backing system 214 may have a variety of safety features, including ECU 22 control of emergency stop. When the safety control switch 242 is released the ECU 22 may interpret the desired vehicle action 28 and the required vehicle response 30 to both (emergency) stopping of the vehicle 10 and placing the transmission into a park mode, when safe. A backing system on/off switch 242 (not shown) may require specific release 1 in order for the ECU 12 to shift control of the vehicle 10 to the user through the backing system 114. The speed the assembly 12 and system 214 may be limited to a safe walking speed (e.g. 2.5 kph), also limited by the minimum speed reported by the vehicle. Other safety measures may include timeout detection, redundant information confirmations such as, respond with interpreted data to check for inconsistencies, and checksum calculations and checks.

Referring to FIGS. 1-4A, the system 14, 114, 214 must have an ECU 22 capable of connecting wirelessly, such as via an RF, Wi-Fi, Bluetooth or another type of wireless connection, to the mobile device 16, 116, 216 and a connection to the vehicle interface(s) 24 for shift, steer, brake and engine torque control. The system 14, 114, 214 may also have a surround view camera system 44 with a stitched image 46, 146, 246 broadcasted for devices 16, 116, 216 to view. The system 14, 114, 214 must have a capable wireless device with control methods implemented for shifting, steering, speed limiting, deceleration and emergency stop, as in the embodiments described above. Other image configurations or controls 36A-E, 136A-E, 236A-E and/or programs or apps may be used to provide the HMI inputs 26A-E, 126A-E, 226A-E. The system 14, 114, 214 must be equipped with a method to measure the trailer angle 40 and output over the vehicle connections to the ECU 22. The wireless communication between the ECU 22 and the device 16, 116, 216 must have safety implementation for data integrity and active connection checks.

The program/app for the device 16, 116, 216 allows for full input to the ECU 22 for control of the vehicle 10. A trigger safety switch 42, 142, 242 and/or control 36E, 136E, 236E can be included to confirm user attentiveness and maintain control of the vehicle 10 with the device 16, 116, 216. The device 16, 116, 216 also provides for the user to shift gears of the vehicle 10, apply the brakes, press emergency stop to park the car and cease control and view the surround view of the vehicle 10. The dead man's trigger 42, 142, 242 requires constant interaction from the user or else vehicle comes to a stop. The function is also speed limited for safe backing. The backing system 14, 114, 214 therefore works in real time, performing each of the inputs 26A-E, 126A-E, 226A-E as they are received and processed by the ECU 22.

As described above, the backing system 14, 114, 214 may use camera(s) 44 on the vehicle 10 to provide a surround view of the vehicle 10. Additionally, the ECU 22 may use the camera 44 information as one method used to measure the current hitch angle 40. The measured hitch angle 40 is used by the ECU 22 to determine the desired steering angle 30 based on the requested hitch angle 28 calculated from the user input 26A-E, 126A-E, 226A-E. The current hitch angle 40 may also be displayed on the device 16 as well for user information.

In all embodiments, the camera 44 may be used to determine hitch angle 40, preferably a camera which is already installed in the vehicle 10, such as a back-up camera or a surround view camera. The camera 44 may capture an image and image analysis may be used to calculate the hitch angle 40.

One embodiment of using the camera 44 to determine hitch angle uses a distinct marking that can be established on the trailer 11 and captured by the camera 44 for analysis. For example, the marking may be a 3 or more of dots/marks spaced apart from one another both horizontally and vertically. The marking is positioned on the front of the trailer 11 proximate to the hitch 15 in view of the camera. The camera 44 may capture an image of the marking and the ECU 22 may analyze the image to determine the relative position of the dots to one another. The ECU 22 compares the relative measured distances of the marks and to stored data of the relative distances. The stored data would include at what hitch angle 40 those relative distances would occur. Thus, the hitch angle 40 can be calculated using a camera for the sensor 26 and a predetermined distinct marking. The markings may be specific to the trailer backing system 14, 114, 214, e.g. a know decal to be applied to the trailer 11, since the relative distances of the markings may be prerecorded by the ECU 22. The distance to the marking from the camera 16 may also need to be input into the system 14, 114, 214.

In another embodiment, the trailer backing system 14, 114, 214 can use reference points on the trailer 11 as markings, such as the corners of the trailer, hitch attachment point, body decals that are provided by the manufacturer, etc. The reference points may be vertically and horizontally spaced from one another. Preferably at least three reference points are used. The ECU 22 may employ a learning mode to learn the relative distances of the reference points at known hitch angles 40 the first time the system 14, 114, 214 is used. Thus, the trailer backing system 14, 114, 214 could learn the relative distances between the markings when the trailer 11 is hitched to the vehicle 10 and at a known angle, e.g. zero degrees hitch angle.

In addition to calculating hitch angle the image from the camera 44 can be shown on the display 46, 146, 246. If multiple cameras are used the surround view of the vehicle 10 may also be integrated to display 46, 146, 246 on the mobile device 16. Additionally, objects 48 on the surround view image 46, 146, 246 can be highlighted to warn drivers of possible collisions. In particular, if the user is near the front of the vehicle 10 the vehicle 10 may rotate around at a faster than expected rate.

The surround view function presents the driver with a dynamic set of synthetic viewpoints that provide an unobstructed view of the ground both in the immediate vicinity of the vehicle 10 as well as in the medium distance. The viewpoints are completely configurable and useful for parking and reversing maneuvers. In one embodiment an extended surround view capability may be provided by using another camera 50 connected at the rear of the trailer 11 to increase visibility.

Whether the display 46, 146, 246 is a single camera 44 or a stitched image providing a surround view, the data transfer from the ECU 22 to the wireless device 16 to provide the display 46, 146, 246 may be quite large. One option for transfer of the information is for the backing system 14 to use a Wi-Fi Network if the vehicle 10 or backing location has one to provide the video feed to the wireless device 16 for the display 46, 146, 246. As discussed above, another option for secured wireless transfer of the data low band with communications, such as RF communications, with the wireless device 16 may be desired to take advantage of external control technologies.

In order to accommodate the low bandwidth and still provide the display 46, 146, 246 only data relating to the most relevant sections may be transferred to the wireless device 16. The less relevant sections 47, 147, 247 of the display 46, 146, 246 may be not shown, or may be schematically represented on the display 46, 146, 246. The not-relevant portion 47, 147, 247 can be "blacked out" to avoid distracting the operator, or can be replaced with a graphical representation of the area. For example, when the backing system 14 is in Reverse gear the area in front of the vehicle 10 is not relevant to the operator. This non-relevant area 47, 147, 247 could be not shown on the display 46, 146, 246 and the data related to that section of the image 46, 146, 246 does not need to be transferred to the wireless device 16. Thus, the amount of data to be transferred is reduced. Additionally, areas that are farther away from the vehicle-trailer unit 12 are less or not as relevant areas 47, 147, 247 as well. These portions 47, 147, 247 of the image 46, 146, 246 can also be not shown.

The center areas of the vehicle 10 and/or the trailer 11 are not as significant to the display 46, 146, 246 either, only the data relating to the edges of the vehicle 10 and/or trailer 11 can be transferred to the wireless device 16. The not-relevant portions 47, 147, 247 of the vehicle 10 and/or the trailer 11 can be "blacked out" to avoid distracting the operator, or can be replaced with a graphical representation of the vehicle 10.

Additionally, objects 48 that are possible obstacles or key areas on the image 46 can be highlighted to warn drivers of possible collisions or to increase the alert level for that area of the display 46, 146, 246. Area 49, 149, 249 also indicates an image that is only available, for display 46, 146, 246 when the trailer 11 has a camera 50 as well. Without area 49, 149, 249 that operator can still easily view the hitch angle 40 and objects that are proximate to the vehicle-trailer unit 12 and not obstructed by trailer 11 for the camera 44 view.

With the trailer backing system 14, 114, 214 of the present invention one user aided by his mobile device 16, 116, 216 may back the trailer into a desired final position in a manner that is intuitive to use and does not require assistance from other people (a spotter is not required).

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a backing system for a vehicle and trailer assembly, the method comprising:
    initiating a backing system mode with an electronic control unit supported by the vehicle for a backing system when a start system input is received from a control device, the control device is wirelessly connected to the electronic control unit and positioned outside the vehicle;
    recording an image of a hitch for the vehicle and trailer assembly from at least one camera supported by the vehicle;
    determining a hitch angle using a plurality of reference points on the trailer which are viewed by the camera;
    determining which portions of the image are relevant to a current position of the vehicle and trailer assembly, and which portions of the image are non-relevant;
    sending data regarding the relevant portions only to the control device via a secured wireless connection;
    displaying the relevant portions of the image on a display for the control device; and
    displaying the non-relevant portions of the image on the display for the controller as a solid color or a graphical representation.

2. The method of claim 1, further comprising:
    receiving at least one input with the electronic control unit from the control device which includes information about a desired vehicle action;
    interpreting from the at least one input the desired vehicle action;
    calculating with the electronic control unit a required vehicle response to achieve the desired vehicle action; and
    sending a request from the electronic control unit to at least one vehicle system to perform the calculated vehicle response.

3. The method of claim 2, wherein the vehicle and trailer assembly move in real time with the at least one inputs received by the electronic control unit.

4. The method of claim 2, wherein the at least one input requests include requests to perform on shift gears of the vehicle, apply brakes of the vehicle, press emergency stop to park the vehicle and cease control, steer the vehicle, and change a surround view of the vehicle.

5. The method of claim 4, wherein the control device has a display screen configured to be a human machine interface capable of receiving at least one of the input requests.

6. The method of claim 4 wherein the at least one input is a steering input and the desired vehicle action is a change in hitch angle, and wherein the steering input is an accelerometer signal from the control device, and the electronic control unit interprets the accelerometer signal to determine desired change in hitch angle; and
    wherein the electronic control unit determines a current hitch angle for the vehicle and trailer assembly based on camera information and determines the required vehicle response as a change in hitch angle.

7. The method of claim 6, wherein the calculated vehicle response is performed only when a control safety button is depressed.

8. The method of claim 1, further comprising the electronic control unit recording respective distances between the plurality of spaced apart reference points on the trailer at known hitch angles and compared the recorded distances to current distances measured by the electronic control unit in the image.

9. A backing system for a vehicle and trailer assembly, the system comprising:
    a wireless control device positioned outside the vehicle; and
    an electronic control unit, wirelessly connected to the control device to receive at least one input from the control device, wherein the electronic control unit includes instructions for:
        initiating a backing system mode with an electronic control unit for a backing system when a start system input is received from a control device;
        recording an image of a hitch for the vehicle and trailer assembly from at least one camera supported by the vehicle;
        determining a hitch angle using a plurality of reference points on the trailer which are viewed by the camera;
        determining which portions of the image are relevant to a current position of the vehicle and trailer assembly, and which portions of the image are non-relevant;
        sending data regarding the relevant portions only to the control device via a secured wireless connection;
        displaying the relevant portions of the image on a display for the control device; and
        displaying the non-relevant portions of the image on the display for the controller as a solid color or a graphical representation.

10. The system of claim 9, wherein the electronic control unit is further configured with instructions for:
    receiving at least one input with the electronic control unit from the control device which includes information about a desired vehicle action;
    interpreting from the at least one input the desired vehicle action;
    calculating with the electronic control unit a required vehicle response to achieve the desired vehicle action; and
    sending a request from the electronic control unit to at least one vehicle system to perform the calculated vehicle response.

11. The system of claim 10, wherein the vehicle and trailer assembly move in real time with the at least one inputs received by the electronic control unit.

12. The system of claim 10, wherein the at least one input requests include requests to perform on shift gears of the vehicle, apply brakes of the vehicle, press emergency stop to park the vehicle and cease control, steer the vehicle, and change a surround view of the vehicle.

13. The system of claim 12, wherein the control device has a display screen configured to be a human machine interface capable of receiving at least one of the input requests.

14. The system of claim 12 wherein the at least one input is a steering input and the desired vehicle action is a change in hitch angle, and wherein the steering input is an accelerometer signal from the control device, and the electronic control unit interprets the accelerometer signal to determine desired change in hitch angle; and wherein the electronic control unit determines a current hitch angle for the vehicle and trailer assembly based on camera information and determines the required vehicle response as a change in hitch angle.

15. The system of claim 14, wherein the calculated vehicle response is performed only when a control safety button is depressed.

16. The system of claim 9, further comprising the electronic control unit recording respective distances between the plurality of spaced apart reference points on the trailer at known hitch angles and compared the recorded distances to current distances measured by the electronic control unit in the image.

* * * * *